United States Patent [19]
Miller et al.

[11] Patent Number: 5,319,161
[45] Date of Patent: Jun. 7, 1994

[54] MECHANISM FOR PREVENTING OVERLOAD ON A WEIGHING SCALE

[75] Inventors: Carl A. Miller, Fairfield; Adonis A. Halaby, Stamford, both of Conn.

[73] Assignee: Pitney Bowes Inc., Stamford, Conn.

[21] Appl. No.: 996,273

[22] Filed: Dec. 24, 1992

[51] Int. Cl.$^5$ .............................................. G01G 23/02
[52] U.S. Cl. .................................................. 177/154
[58] Field of Search ....................................... 177/154

[56] References Cited

U.S. PATENT DOCUMENTS

| | | | |
|---|---|---|---|
| 4,420,054 | 12/1983 | Caris | 177/154 |
| 4,479,561 | 10/1984 | Feinland et al. | 177/154 |
| 4,726,435 | 2/1988 | Kitagawa et al. | 177/154 X |
| 5,048,624 | 9/1991 | Pike | 177/154 |
| 5,072,799 | 12/1991 | Freeman et al. | 177/154 |
| 5,235,141 | 8/1993 | Iida | 177/255 |

*Primary Examiner*—George H. Miller, Jr.
*Attorney, Agent, or Firm*—Peter Vrahotes; Melvin J. Scolnick

[57] ABSTRACT

The instant invention is concerned with providing safeguards that prevent damage to weighing scale in the case of an overload applied to the side edges of the scale platform. In addition, the invention prevents damage to the weighing mechanism of the scale due to torquing when one attempts to lift the scale by the platform.

6 Claims, 3 Drawing Sheets

MECHANISM FOR PREVENTING OVERLOAD ON A WEIGHING SCALE

BACKGROUND OF THE INVENTION

Although load weighing scales have been used extensively, throughout the years the use of scales in a high speed sheet conveying apparatus has not been common practice. In a device such as a mailing machine, mailpieces are conveyed in series past a number of stations for performing tasks in the processing of the mailpieces. These tasks could include placing inserts into an envelope, sealing the envelope to form a mailpiece, and placing a postage meter indicia on the mailpiece. In order to determine the amount of postage required, the mailpiece must first be weighed. A weighing scale for performing such a task should be able to operate at least at the same speed as the other components in the system, this usually being in excess of one mailpiece a second.

Scales capable of such high speed operation have recently been commercialized, as for example in the Paragon mail processor available from Pitney Bowes Inc. High speed scales have also been described in patents, see for example U.S. Pat. No. 4,856,602; 4,848,492 and 4,836,311. Although these scales have proven successful, a need for greater protection in the case of overload on the platform of the scale is needed. Overload protection is generally provided for scales when a load is dropped normal to the weighing platform, but it has been found that protection is also required to protect the scale for loads dropped on the edges of the platform or when one attempts to lift a scale by holding the platform.

SUMMARY OF THE INVENTION

Apparatus for preventing damage to the weighing mechanism of a scale has been conceived for circumstances where an overload is dropped on the edges of the scale platform or when one attempts to lift the scale by holding the platform. The invention is described as it can be used in a load cell scale, but it will be appreciated that it can be applied to other types of weighing scales equally well including a vibrating tray scale described in the above referred to patents. A pair of struts are connected to the bridge or base of the scale with the struts being spaced relative to openings in the platform. Preferably, the struts are at an angle relative to an edge of the platform. If an overload is dropped on the edge of the platform, the struts absorb the shock, and no damage is caused to the scale mechanisms. Also, when one attempts to lift the scale by pulling upwardly on the platform, the struts contact the platform to prevent damage to the weighing mechanism.

DETAILED DESCRIPTION OF THE PREFERRED EMBODIMENT

Figure 1:
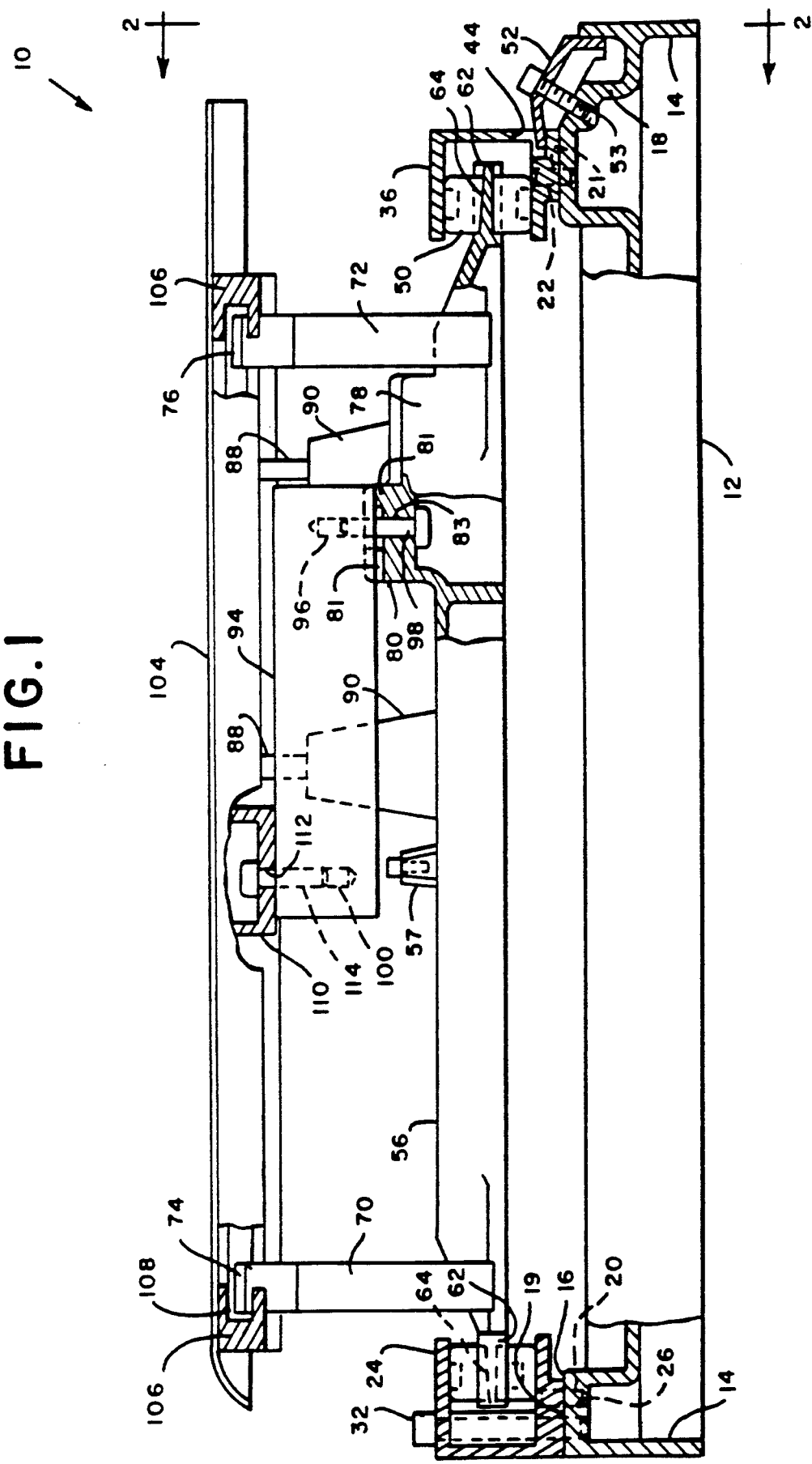
FIG. 1 shows a cross sectional, longitudinal view, partially cut away, of a weighing scale that incorporates the features of the instant invention.
Figure 2:
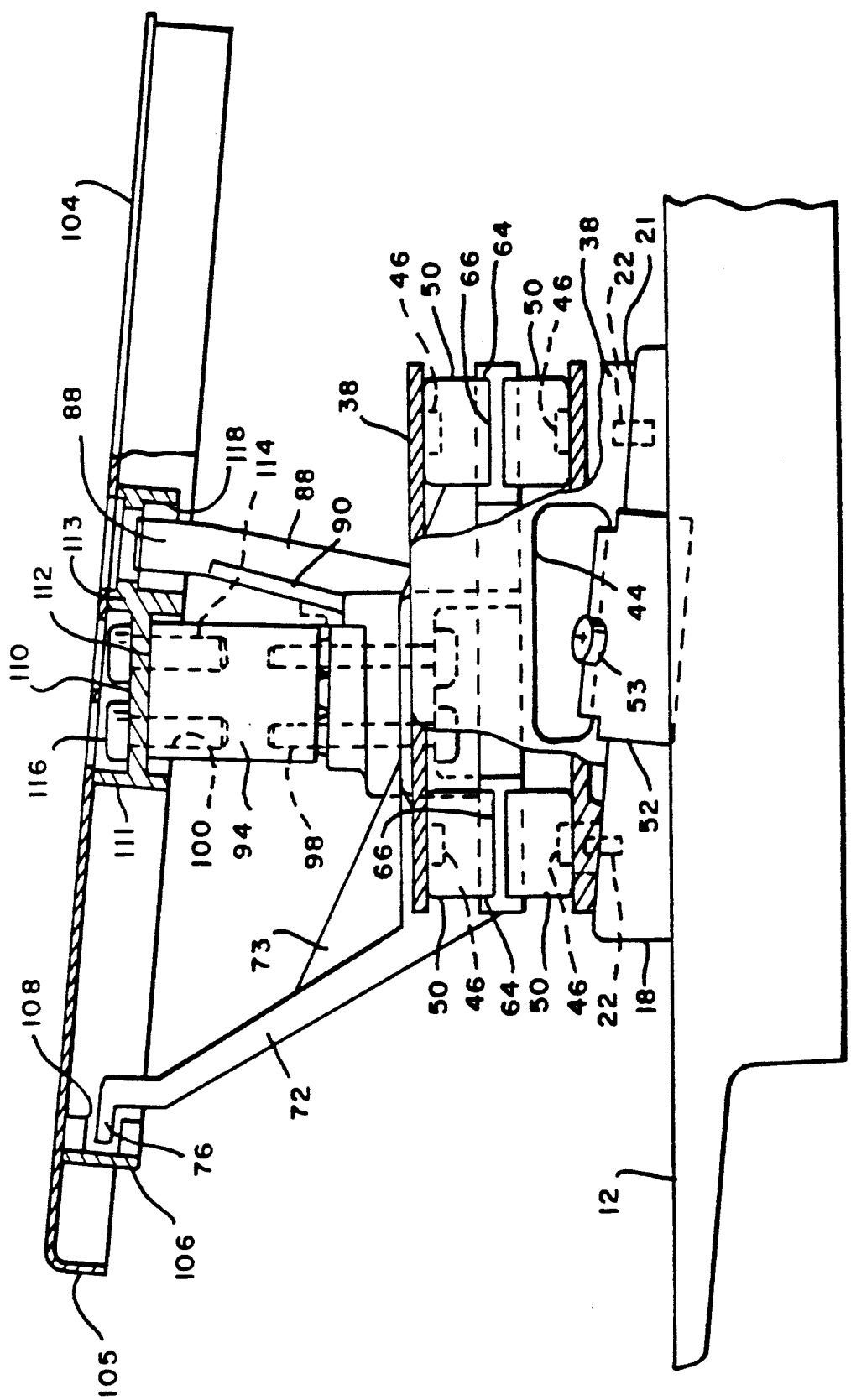
FIG. 2 is a view taken along the lines 2—2 of FIG. 1.
Figure 3:
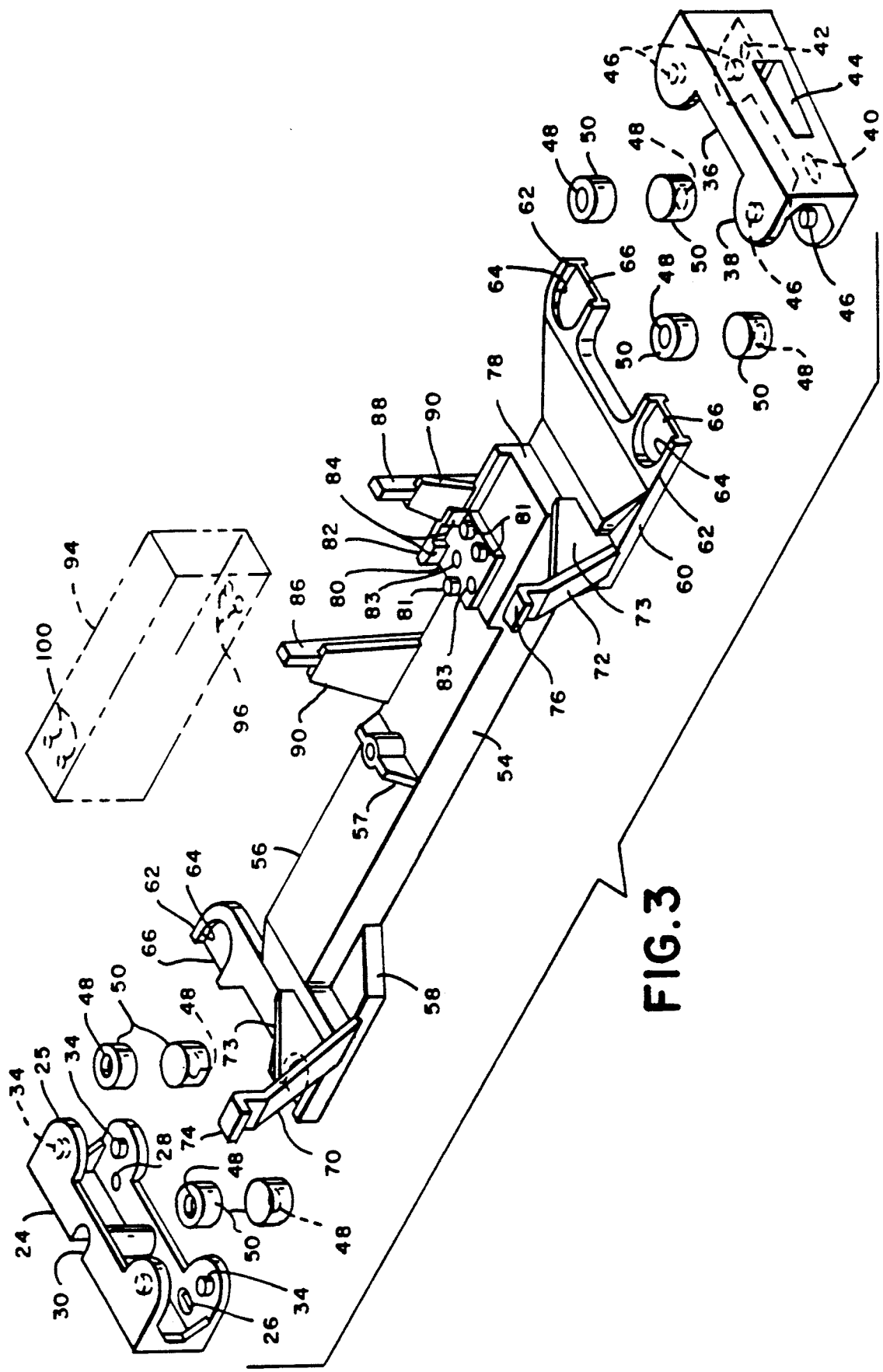
FIG. 3 is a perspective view of portions of the scale shown in FIG. 1.

With reference to the drawing, a load cell scale in which the invention can be practiced is shown generally at 10. A base 12 is provided that has laterally extending raised portions 14 at its longitudinal ends, with one raised portion forming a generally square cross section of the side walls having a ledge 16 and the other raised portion having a generally s-shaped member configuration 18. These two raised portions 16, 18 have upper surfaces 19, 21, respectively, that form an angle relative to the horizontal as seen in FIG. 2. A pair of laterally aligned pins 20, 22 is secured to each of the upper surfaces 19, 21. A first clamp 24 that is tapered from back to front, as seen in FIG 3, has four fingers 25 extending therefrom in paired, spaced relationship and an elongated opening 26 and a circular opening 28 at the bottom thereof to receive the pins 20. The reason for the elongated opening 26 is to provide clearance during assembly of the components of the scale 10. The clamp 24 has indentation 30 so as to receive a bolt 32 to be secured to the upper surface 19 of the raised portion 16. The tapered clamp 24 also has bosses 34 extending inwardly from each of the fingers 25.

On the opposite longitudinal side of the scale 10 is another back to front tapered clamp 36 also having four fingers 38 extending inwardly therefrom in paired, spaced relationship and an elongated opening 40 and a circular opening 42 at the base thereof. The tapered clamp 36 also has a laterally extending opening 44 on the backside thereof. Bosses 46 extend inwardly from the fingers 38 of the clamp 36. The bosses 34 and 46 of the tapered clamps 24, 46, respectively, are received within openings 48 of a plurality of bushings 50, the bushings being paired vertically so that a pair of bushings is located intermediate each of the fingers 25, 38, of the clamps 24, 36, respectively.

The clamps 24, 36 are tapered so as to conform to the raised portions 14 and render the upper surfaces of the clamps level. The raised portions 14 were required to form an angle because of the particular requirements of the apparatus in which the weighing scale 10 was mounted in the reduction to practice of the invention and such taperings may not be required in other environments.

A longitudinally extending bridge 54 having a central beam 56 is located above the base 12 and has a stop 57 intermediate its ends. Secured to the ends of the beam 56 are a pair of pads 58, 60, each of which is fanned into a pair of fingers 62 outwardly extending therefrom. Each finger 62 has a circular recess 64 that has located vertically intermediate its sides a tapered edge 66. The fingers 62 are received within the clamps 24, 36 with the tapered edges 66 being received intermediate a pair of aligned bushings 50. The tapered edges 66 are tapered outwardly, i.e. the edges become thinner as they extend outwardly from the pads 58, 60, so as to be more easily urged between the paired bushings 50 that are held in place by the studs 34, 46. The bushings 50 are made of a resilient material so as to provide isolation of the bridge 54 from the base 12.

Extending on opposite ends of the beam 56 are preferably rigid struts 70, 72 that are secured to the beam by support members 73 that are attached to the pads 58, 60. The struts 70, 72 have fingers 74, 76, respectively, extending therefrom. A platform 78 is located at one longitudinal end of the beam 56 and has thereon a leveling seat 80, whose function will be described hereinafter. The leveling seat 80 has a plurality of pads 81, a pair of through openings 83, and a side wall 82 having a pair of lands 84 thereon. A pair of longitudinally spaced uprights 86, 88 are secured to the beam by ribs 90.

A weighing mechanism, in the form of a load cell 94 has a pair of threaded openings 96 each of which receives a screw 98 that extends through the openings 83 to be received and secured by the threaded openings 96. As is known, a load scale is a device for determining the weight of an object placed on the platform of a scale by measuring the amount of deflection of the load cell. It will be appreciated that this is only one of a number of devices that determine weight in this manner, others being spring scales and vibrating tray scales. The combination of the pads 81 upon which the bottom of the load is rested, the lands 84 against which one side of the load cell abuts and the bolts 102 extending through the openings 83 and screwed into the threaded openings 96 assure the load cell being mounted on the seat 80 in a level, properly aligned position.

A platform 104, having the form of a cover with a depending rim 105, is located above the bridge 56. A web 106 (only portions of which are shown) is secured to the underside of the platform 104. The web 106 forms two channels 108 at the edge of the platform 104 that receive the fingers 74, 76 of the struts 70, 72. It will be noted that the fingers 74, 76 are located intermediate, i.e., spaced relative to the upper and lower surfaces of the channels 108, and do not contact the same in the normal position as seen in FIG. 2. With such structure the struts 72, 72 do not interface with the weighing operation. The uprights 86 and 88 support a reflective photocell device (not shown) that is aligned with an opening 114 formed by the web 106. The web 106 also forms a bracket 110 with openings 112 therein for receiving screws 114 that are received within threaded openings 100 of the load cell 94 for securing the platform 104 to the load cell 94. In this way the load cell 94 acts as a connector between the platform 104 and the bridge 54 and base 12.

The platform 104 is at an angle relative to the horizontal. This is accomplished by the configuration of the bracket assembly 110 which has a one wall 111 higher than the other 113. The reason for the platform being at an angle is so that it will act as a guiding member whereby mailpieces conveyed thereacross are urged toward a locating plate (not shown). This is important for the printing of an indicia on a mailpiece at the proper location.

It will be appreciated that the scale described is one in which flat items, such as mailpieces, are conveyed thereacross. Although the means for such conveyance is not shown, attention is directed to U.S. Pat. Nos. 4,856,602, 4,848,492, and 4,836,311 for descriptions of mechanisms for conveying articles such as a mailpieces across the platform of a scale, stopping and holding the mailpieces during the weighing operation and removing the mailpieces thereafter.

As stated previously, the fingers 74, 76 do not engage any portion of the platform 104 when received within the channels 108. In addition, the stop 57 is spaced relative to the load cell 94. The reason for such spacing of the struts 70, 72 and stop 57 relative to the platform 104 is for the purpose of protecting the platform should an overload condition exist. The use of a stop 57 is well known, but the concept of the struts 70, 72 is unique. The fingers 74, 76 will not interfere with the operation of the weighing mechanism 94 during weighing because of the spacing described. In this way articles can be weighed and the normal deflection takes place. On the other hand, if an overload is dropped on the edge of the 104 platform, the fingers 74, 76 will engage the upper surface of the channels 108 of the platform 104 at one of the platforms lateral edges and the struts 70, 72 will protect the load cell 94 by preventing overload due to torquing. If the load is normal to the platform 104, the stop 57 will also prevent undue deflection on the load cell that would damage the strain gauges. Another form of protection served by the struts 70, 72 is to prevent effects of reverse torquing. This will occur should one attempts to lift the scale 10 by grabbing the edge of platform 104 and lifting.

Thus, what has been shown and described is weighing scale that is protected from damage to the weighing mechanism 94 of the scale in the instance of excess torquing. This can occur when an overload is dropped on the sides or edges of the scale platform and when one attempts to lift the scale by the platform.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A weighing scale comprising:
  a) a base,
  b) a longitudinally extending platform located above said base and having an opening formed on the lateral underportion thereof,
  c) a load call weighing mechanism attaching the platform to the base, and
  d) a stop member strut attached to and extending from the base and one end thereof and having a finger at the distal end thereof that is received by said opening in a non contact manner when no load is on said platform.

2. The weighing scale of claim 1 wherein said strut extends from said base at an angle relative to the said base.

3. The weighing mechanism of claim 1 wherein said stop members are rigid.

4. A weighing scale comprising:
  a) a base,
  b) a horizontally extending platform having openings formed on the underportion thereof located above said base
  c) a load cell weighing mechanism attached to the said platform and to said base to provide connection between said platform and said base, and
  d) a pair of struts extending generally vertically from said base and being spaced below and relative to said platform, said struts having fingers at the distal ends thereof that are received by said openings in a non contact manner when no load is on said platform.

5. The weighing scale of claim 4 wherein said struts extend from said base at an angle relative to the horizontal.

6. The weighing scale of claim 4 wherein said openings are channels formed by a channel member located along at least one edge of said platform and said struts form generally horizontally extending fingers at their ends thereof and each of said fingers is received within a channel in a spaced relationship whereby upon a load being placed upon said one edge of said platform at least one of said fingers will contact said channel member and upon an upward load being applied to said platform at least one of said fingers will contact said channel member thereby preventing overload to said weighing mechanism.

* * * * *